United States Patent [19]

Longuet

[11] 3,814,847

[45] June 4, 1974

[54] TELEVISION SIGNAL PROCESSING DEVICE

[75] Inventor: Maurice Longuet, Paris, France

[73] Assignee: Thomson-CSF, Paris, France

[22] Filed: Dec. 27, 1971

[21] Appl. No.: 211,981

[30] Foreign Application Priority Data

Oct. 26, 1971 France .............................. 71.38452

[52] U.S. Cl. ............................ 178/7.1, 178/DIG. 25
[51] Int. Cl. ............................................. H04n 5/14
[58] Field of Search ................ 178/7.1, 7.2, DIG. 25

[56] References Cited

UNITED STATES PATENTS

| | | | |
|---|---|---|---|
| 3,444,318 | 5/1969 | Monteath | 178/DIG. 25 |
| 3,536,826 | 10/1970 | McMann, Jr. | 178/DIG. 25 |
| 3,562,424 | 2/1971 | Legler | 178/DIG. 25 |

OTHER PUBLICATIONS

McMann Jr. et al. – Improved Signal Processing Techniques for Color Television Broadcasting –Jour. of SMPTE – Vol. 77 – March 1968– pp. 221–228.

Gibson et al. – A Vertical Aperture Equalizer for Television – Jour. of SMPTE– Vol. 69 No. 6– June 1960 – pp. 395–401.

*Primary Examiner*—Robert L. Griffin
*Assistant Examiner*—Joseph A. Orsino, Jr.
*Attorney, Agent, or Firm*—Cushman, Darby & Cushman

[57] ABSTRACT

In order to obtain a contour corrected image signal, from which the noise is eliminated in the transition-free zones, a contour signal, derived from a blurred image signal (translating an image which is blurred as compared with that which is translated by the signal which is being processed, but from which the noise has been substantially eliminated) is added, with a suitable gain, to the blurred image signal.

5 Claims, 2 Drawing Figures

TELEVISION SIGNAL PROCESSING DEVICE

The present invention relates to improvements in television signal processing devices and particularly to those devices which compensate for loss of detail due amongst other things to the scanner device.

During the scanning operation which is carried out in the tube of a television camera, for example, the electron beam scanning the tube target has geometrical dimensions which can alter the fineness of the scanning operation. In particular, the light transitions in the image may appear blurred when the image is reconstituted in the receiver.

It is well-known to carry out a horizontal aperture correction on the video signal produced by the scanner tube, this correcting the inaccuracy of scanning along the scanned lines. This correction to the horizontal aperture is a simple one to carry out and utilizes a network for correcting the amplitude of the video signal as a function of the frequency.

Various systems for correcting vertical aperture have already been introduced, these enabling certain inaccuracies of scanning, due for example to overlapping of the electron beam onto lines adjacent to the scanned line, to be corrected. These corrections to vertical aperture, are produced in a conventional manner by means of delay lines, there being added to the video signal corresponding to the scanned line a signal derived from those corresponding to the lines above and below it.

On the other hand, it has been proposed that by means of an auxliary scanner tube which is deliberately defocussed, a signal should be generated which produces a picture which is blurred compared with that translated by the signal being processed. A contour, or detail, signal, essentially formed by a signal proportional to the difference between the signal being processed and the blurred picture signal, is added to the signal being processed in order to produce the corrected signal.

In order to reduce the noise components introduced by the contour signal, the difference signal can be subjected to various kinds of processing prior to the formation of the contour signal.

The object of the present invention is a device which enables a corrected signal to be obtained in which the noise component has largely been eliminated from the transition-free zones, that is to say where it would most disturb the eye.

In accordance with the invention, there is provided a device for processing a television input signal, said device comprising: means for generating a signal which will be referred to as the "blurred image signal" and which translates an image which is blurred compared with the one translated by said input signal; a first circuit, supplied with said input signal and with said blurred image signal for producing a contour signal; and an adder having a first input for receiving said contour signal, a second input for receiving said blurred image signal, and an output for delivering a contour corrected signal.

The invention will be better understood from a consideration of the ensuing description and the related drawings in which.

Figure 1:
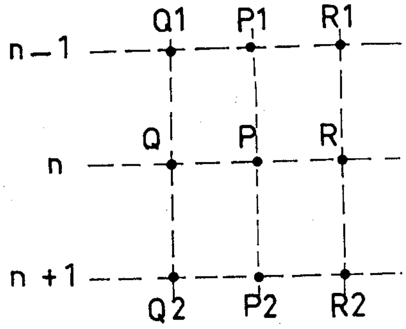
FIG. 1 is an explanatory diagram.

FIG. 1 illustrates a point P in the image on the screen of a camera tube, the point P being located on the $n^{th}$ scanning line of a field, the points Q and R of the $n^{th}$ line being located at a distance $d$ to the left and the right of the point P, three points $P_1$, $Q_1$, $R_1$ of the $(n-1)^{th}$ line of the same field, being respectively located on the verticals passing through P, Q and R, and three points in the $(n+1)^{th}$ line, $P_2$, $Q_2$, $R_2$ respectively being situated on the verticals passing through P, Q and R.

In the device about to be described, the point P, translated at the time $t$ in the input signal by $S(t)$, is translated in the blurred image signal Z (at the time $t+H+\theta$, where H is the line period, and $\theta$ a much shorter time interval which will be defined hereinafter) by the mean value of the signal $S(t)$ for the nine points of FIG. 1, this making it possible to obtain a blurred image which is as omnidirectional as the scanning method utilized in television work permits (thus producing an equally omnidirectional contour signal), and a signal $Z(t)$ the noise component of which has been eliminated to a large extent by the extensive compensation which takes place between the uncorrelated noise components affecting the nine signals which go to make up the signal $Z(t)$.

For this reason, in the device in accordance with the invention, this signal is retained for the substantially uniform part of the picture where, in other words, it is not substantially distinguishable from the input signal except by a reduced noise component. In other words, the contour signal is no longer added to the input signal but to the blurred image signal. As far as the reinforcing of the transitions is concerned, it is merely necessary to give the contour signal a gain which is higher in relation to the difference between the input signal and the blurred image signal, than would have been the case if the contour signal had been added to the input signal in order to produce the output signal. In other words, if, in the second case, to obtain a desired result a gain of $g$ is used, to achieve the same result a gain of $(g+1)$ will be used in the device in accordance with the invention.

As far as the choice of the eight points surrounding the signal P in FIG. 1 is concerned, this comes down to a choice of the points Q and R, in other words of the duration $\theta$. As indicated earlier, the other points are homologous with the points P, Q and R on the adjacent scanning lines. This choice is due to the fact that the interval can only correspond to a whole number of scanning lines and experience shows that a contour signal which is satisfactory in the vertical direction can be obtained for a given line as a function of the two scanning lines surrounding said given line.

By contrast, in the horizontal direction there is nothing to impose a precise value of $\theta$ within a certain interval, the actual choice being dictated more by considerations of contour correction than of noise. By way of a satisfactory example one could take $$\theta=0.1\mu s \text{ (for } H=64\mu ss\text{)}.$$

Figure 2:
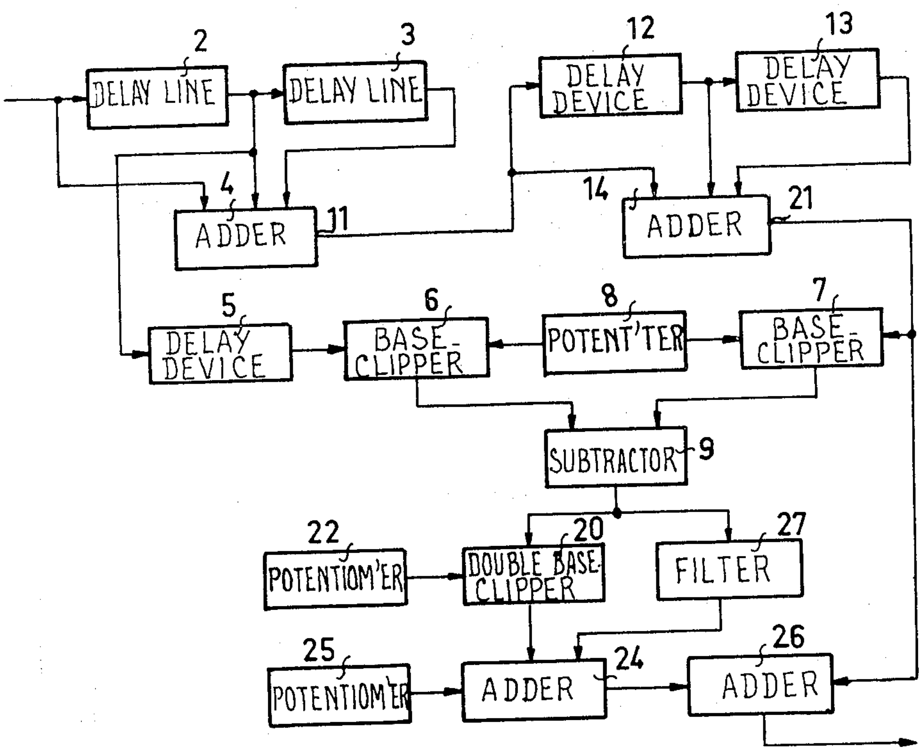
FIG. 2 is a diagram of an embodiment of a device in accordance with the invention.

In FIG. 2, an embodiment of the processing device, assumed to be used in a colour television camera, and receiving a pseudoluminance signal which is essentially formed by a wide-band signal containing the whole of the green and parts of the blue and red, has been illustrated.

To the input 1 of the device, two delay lines 2 and 3 are connected which are arranged in series and each produce a delay equal to the line period H.

The input 1 and the outputs of the delay lines 2 and 3 are connected to the three inputs of an adder 4 so adjusted as to produce a signal having a value equal to one third of the sum of the three input signals.

To the output 11 of the adder 4, there are connected two delay devices 12 and 13 arranged in series and each producing a delay of $\theta$=0.1$\mu$s.

The outputs of the adder 4 and the delay elements 12 and 13 are connected to the three inputs of an adder 14 which is likewise adjusted in order to produce one third of the sum of its input signals.

It can readily be shown that if $S(t)$ designates the signal applied to the input 1, then at the instant $t$ there will appear at the output 21 of the adder 14 a blurred image signal $Z(t)$ such that $$9Z(t) = S(t-2H-2\theta) + S(t-2H-\theta) + S(t-2H) + S(t-H-2\theta) + S(t-H-\theta) + S(t-H) + S(t-2\theta) + S(t-\theta) + S(t),$$

the signal $Z(t)$ thus having a value equal to the mean of the values of the input signal for the point P translated by values of the input signal for the point P translated by $S(t-H-\theta)$ and for the eight surrounding points (as shown in FIG. 1).

The contour signal can therefore only be generated after having delayed the input signal $S(t)$ by $H+\theta$ using a delay device 5 connected to the output of the delay line 2 and delivering the signal $S_1(t) = S(t-H-\theta)$.

The delayed input signal $S_1(t)$ and the blurred image signal $Z(t)$ are applied to the two inputs of a subtractor 9 respectively through two base-clippers 6 and 7 which can be manually adjusted to the same level by means of a device 8 such as a potentiometer. The subtractor device 9 thus produces a difference signal which is artificially cancelled for the lowest pseudo-luminance levels of the picture, which levels will belong to the zone of steepest slope of the voltage/pseudo-luminance characteristic resulting from the gamma correction.

The output signal from the subtractor 9 is applied on the one hand to the device 20 which we will be referred to as a double base-clipper and on the other hand to a filter 27.

The double base-clipper 20 enables the correcting signal (which, unlike the input signal and the blurred image signal, is a two-polarity signal during the picture scanning periods), to be limited to either side of its mean value, which is zero, in order to suppress the noise.

The correction signal (disregarding the noise) is zero throughout the whole of the picture area in which no transition occurs; thus, in these areas, the correcting signal will not introduce any noise component.

The double-clipping zone is adjustable by means of a manually operated potentiometer 22.

The filter 27 enables the correction signal to be ridded of unwanted components, for example those which might be too close to a colour sub-carrier.

The output signal $C_1$ from the filter 27 and that $C_2$ from the double base-clipper 10, are applied to the two inputs of an adder 24 delivering a contour signal $$C=pC_1+(1-p)C_2$$

where $p$ can be controlled by means of a manually controlled potentiometer device 25 in order that C can be made up, at will, either of the signal $C_1$, or the signal $C_2$, or of a variable combination of the two, i.e., p may vary between 0 and 1.

Finally, the signal C is added to the blurred image signal in an adder 26 whose output is the output of the device described.

It will be observed that the use of the signal $C_1$ enables a better rendering of the low-amplitude details to be achieved within the passband of the filter 27, and enables the components of all the details occurring within the stop band of the filter to be eliminated, however without limiting the noise other than by the filter effect.

By contrast, the utilization $C_2$, although providing a poorer rendering of the low-amplitude details, procures, along with a reinforcement of other details, the indicated advantages as far as noise-elimination is concerned.

Of course, the invention is not limited to the embodiments described and shown which were given solely by way of example.

What is claimed is:

1. A device for processing a television input signal, $S(t)$, said device comprising a delaying and adding circuit for deriving from said input signal a further signal representative of the same image as said input signal but with a lower horizontal and vertical definition; a second circuit for delivering a contour signal, said second circuit having an output and comprising a subtracting device having first and second inputs respectively supplied with said input signal and with said further signal and an output, said output of said second circuit being coupled to said output of said subtracting device; and an adder having a first input coupled to said ouptut of said second circuit for receiving said contour signal, a second input coupled to said delaying and adding circuit for receiving said further signal, and an output for delivering a contour corrected signal.

2. A device as claimed in claim 1, wherein said delaying and adding circuit is a circuit for delivering a signal $Z(t)$ which is a linear function of the nine signals $S(t-2H-2\theta)$, $S(t-2-\theta)$, $S(t-2H)$, $S(t-H-2\theta)$, $S(t-H-\theta)$, $S(t-H)$, $S(t-2\theta)$, $S(t-\theta)$ and $S(t)$, where H is the line period and $\theta$ a duration which is small compared with H and wherein said first input of said subtracting device receives said input signal delayed by $H+\theta$.

3. A device as claimed in claim 2, wherein said linear function is the mean of said nine signals.

4. A device as claimed in claim 3 wherein said second circuit further comprises a double clipper which clips its input signal to either side of its mean value, and a filter, the two being supplied in parallel by said output of said subtracting device, and a further device, having an output, and two inputs respectively coupled to said double clipper and to said filter, for producing a contour signal of the form $pC_1+(1-p)C_2$ where $C_1$ is the output signal from said filter, $C_2$ that from said base clipper and $p$ a parameter variable between zero and 1 said output of said further device forming said output of said second circuit.

5. A device as claimed in claim 4, wherein said second circuit further comprises two base-clippers through which said delayed input signal and said further signal are respectively applied to said subtracting device.

* * * * *